Patented Nov. 28, 1944

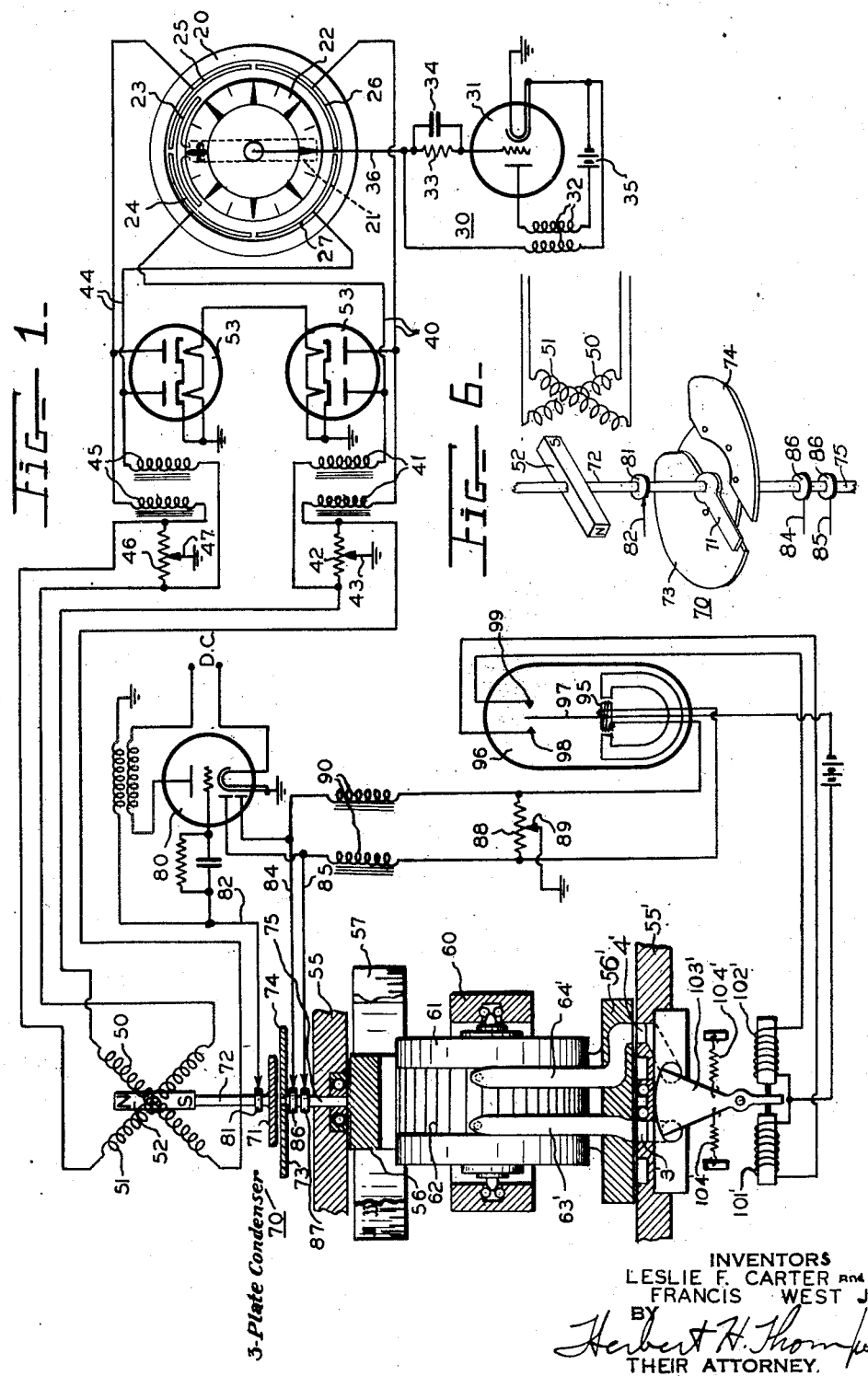

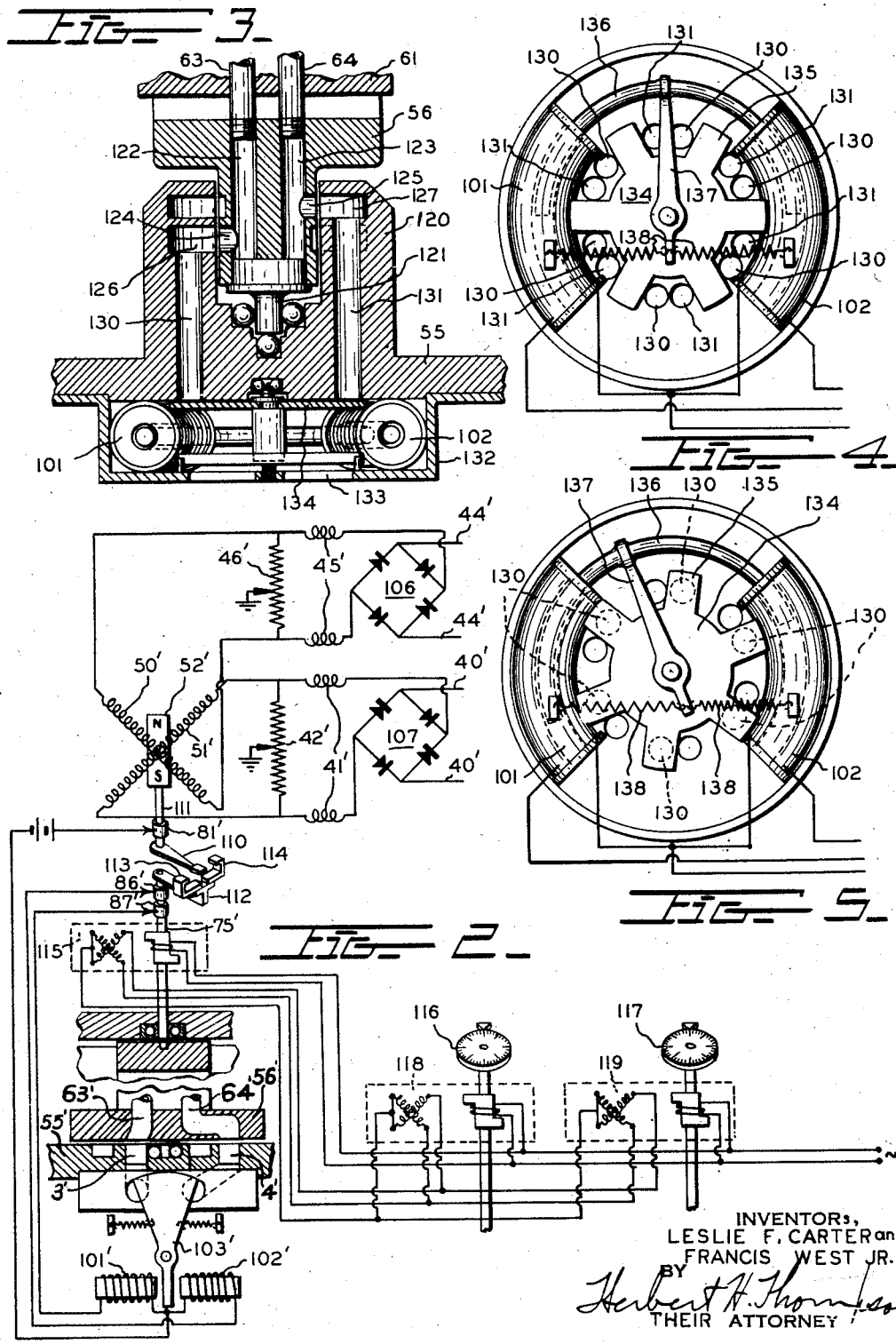

2,363,500

UNITED STATES PATENT OFFICE 2,363,500

GYRO MAGNETIC COMPASS SYSTEM

Leslie F. Carter, Leonia, N. J., and Francis West, Jr., Roslyn, N. Y., assignors to Sperry Gyroscope Company, Inc., Brooklyn, N. Y., a corporation of New York Application November 6, 1941, Serial No. 418,032

11 Claims. (Cl. 33—222)

This invention relates to an improved gyromagnetic compass system and particularly to a system of this character in which a directional gyro is made to integrate the movements of a magnetic compass instrument and thereby provide a non-oscillatory reference magnetic heading for the craft on which the system is employed.

One of the objects of the invention is to provide a system of this kind in which the directional indication of the gyroscope becomes less subject to wandering and therefore more dependable as a compass, by being slaved to a magnetic compass.

A further object of the invention is to provide a gyromagnetic compass system in which the direction indication of the gyro closely corresponds to the average position of the oscillatory direction seeking element of the compass instrument.

One of the features of the invention resides in the provision of means for obtaining a positional comparison of the respective directional indications of the independent gyro and compass instruments of the system and in utilizing disagreement in such comparing means for effecting operation of precession causing means for the gyro to restore agreement therein.

Another feature of the invention consists in the employment of repeater devices by which the positional indications in the comparing means of the system can be obtained from both the gyro and the compass instrument.

Our invention further constitutes an improvement in telemetric systems of the variable condenser or capacitance type which are especially adapted for transmitting the position of a magnetic compass to a distance.

Still a further feature of the invention resides in the specific form of the selecting means employed for permitting the passage of air to only one or the other of two air directing elements by which precession of the gyro instrument is controlled.

Other objects, features and structural details of the invention will be apparent from the following description when read in connection with the accompanying drawings, wherein:

Fig. 1 is a diagrammatic view of the improved gyromagnetic compass system.

Fig. 2 is a similar type of view to Fig. 1 showing modified arrangements in parts of the system.

Fig. 3 is a detail vertical section of a portion of the directional gyro of the system showing an improved form of air controlled precession regulating means.

Fig. 4 is a plan view of the control unit shown in Fig. 3, the same being removed from the gyro casing.

Fig. 5 is a further plan view of the control unit shown in an operative position.

Fig. 6 is a perspective, somewhat diagrammatic view of the comparing condenser and position-repeater device associated therewith.

With reference to Fig. 1, the embodiment of the invention illustrated therein includes a system controlling compass instrument indicated diagrammatically at 20. The magnetic member 21 of the compass actuates a compass card 22 having conventional markings thereon. The container or bowl of the compass instrument may be filled with a suitable damping fluid which also serves as an effective dielectric between the provided condenser plates thereof.

A condenser plate 23 is mounted in the instrument for movement with the magnetic member 21 which may be accomplished by situating the parts on the same vertically located shaft or in some other desirable manner. Also, the plate 23 may be placed upon a separate element of the compass which is magnetically coupled to the compass needle or controlling magnetic member to obtain corresponding movement of these respective parts. Condenser plate 23 is preferably constructed of a very light metal such as aluminum and may be suitably counterbalanced so that it has little effect on the inertia, damping or period characteristics of the compass instrument. The curved periphery of the plate 23 is of such a size as to extend approximately 90 degrees of the circumference of the pivotally mounted portion of the compass instrument.

Plate 23 forms the movable element of a variable condenser which also includes, in the embodiment of the invention shown in this figure, separate condenser plates respectively designated at 24, 25, 26, and 27. The relatively stationary condenser plates 24 to 27 inclusive are arranged in circular formation and are supported in any desired manner within the compass instrument closely adjacent the relatively movable plate 23 which is pivoted at the center of the annular formation of stationary plates. Also, the movable plate in this form of the invention provides a pivotally mounted member adapted to assume an angular position corresponding to the azimuth position of the magnetic or sensitive member 21 of the compass instrument. The respective plates 24 to 27, inclusive, are spaced from one another and oppositely disposed pairs of the same cooperate with the relatively movable plate 23 to control the respective bridge-like circuits, hereinafter termed bridge circuits, employed in the illustrated form of the invention. This form of condenser is sometimes termed a differential condenser and is of the type specifically disclosed in the patent to Francis West, Jr., 2,277,027 dated March 24, 1942, for Telemetric systems.

All the designated condenser plates are concentric with the compass card of the compass instrument, if such is employed, so that the movable plate is spaced equidistantly from the respective stationary plates with which it cooperates. Further the plates may also have a spherical surface, if desired, so that a dipping movement of the card in the bowl will not produce any capacity change in the electric circuits associated with the plates. It will be clear that changes in capacity of the bridge circuits employed in this form of the invention will result only from movement of the magnetic member 21 or sensitive element and the associated movable plate 23 in a substantially horizontal plane.

As shown, the related pairs of relatively stationary plates 24 to 27, inclusive, are located diametrically opposite each other. Each pair of diametrically opposed stationary plates forms part of a high frequency alternating current circuit, which is provided with a substantially constant high frequency alternating current of, for example, 1 megacycle from any suitable source such as an oscillator circuit 30 including the usual triode tube 31, inductively coupled coils 32, grid leak resistor 33, bypass condenser 34, and source 35 of plate voltage. Current of the desired high frequency is conducted to the condenser plates through lead 36 which is connected in any suitable manner through the bowl of the compass instrument to the movable condenser plate 23.

Each oppositely disposed pair of the stationary condenser plates, for example 24 and 26 is connected through leads 40 and choke coils 41 to the opposite terminals of a potentiometer 42 the adjustable element 43 of which is suitably grounded. Plates 24 and 26, the leads 40, coils 41 and potentiometer form an impedance capacity bridge circuit. A similar arrangement is provided for the other shown pair of stationary plates 25 and 27 which are connected through means of the leads 44 and choke coils 45 to the opposite terminals of potentiometer 46, the movable element 47 of which is also suitably grounded.

In this form of the invention, the means for repeating the angular position of the magnetic member 21 or rotatably mounted sensitive element of the compass instrument includes a number of crossed coils such as designated at 50 and 51 which correspond in arrangement to the paired relatively stationary condenser plates 24 to 27 inclusive. Coil 50 is connected across the bridge circuit formed by the leads 40 and is controlled by condenser plates 24 and 26 while coil 51 is connected across the bridge provided by the leads 44 and likewise controlled from condenser plates 25 and 27. The repeater further includes a rotatably mounted permanent magnet 52, the angular position of which is determined by the resultant magnetic field produced by the perpendicularly disposed coils 50 and 51.

Means are provided in each bridge circuit for rectifying the alternating current employed for use in the coils of the position repeating means shown. In the instant case, a double diode tube 53 is employed for this purpose with each bridge circuit. Each tube 53, has its separate plates connected to opposite sides of the associated bridge circuit and the cathode of each tube is grounded. Obviously, each double diode tube operates as a half wave rectifier for the current in each bridge circuit by-passing the positive half cycle, for example, back to the oscillator circuit 30, but passing the negative half cycle through the associated bridge, the choke coils serving to remove any remaining component of alternating current. As a result, a direct current potential is established in each of the separate bridge circuits, and differences in the relative capacity of the bridge circuits resulting from movement of the movable condenser plate 23 with respect to plates 24 to 27, inclusive, will result in corresponding differences of potential being established in each of the stationary crossed coils 50 and 51 of the repeating means. As a result the movable element 52 or permanent magnet of the repeating means will repeat the angular movement of condenser plate 23 or magnetic member 21, and will take an angular position in agreement with the azimuth position of the direction indicating member 21. In the form of invention shown in Fig. 1, the rotatably mounted member or magnet 52 of the repeater means consequently provides, along with the accompanying devices for operating the same, the means for repeating the azimuth position of the oscillatory direction indicating sensitive element 21.

In use, the compass position repeating devices operate as follows. With the compass sensitive element pointing in a due north position as indicated in the drawings, the movable condenser plate 23 will be so located as to extend over equal portions of the two adjacent stationary plates 24 and 25 each of which is connected to a separate bridge circuit. It will be assumed that each of the potentiometers 42 and 46 has been so adjusted as to properly balance each of the respective bridge circuits employed. Under the considered circumstances, the capacities in the respective separate bridge circuits are equal with the result that the magnetic fields established in the crossed coils 51 and 50 are also equal so that the rotatably mounted magnet 52 of the repeater will be positioned midway between the two coils as shown in the drawings. Any shift or movement of the compass controlled movable condenser plate 23 will vary the relative capacity of the separate bridge circuits in such a way as to change the magnetic flux of the crossed coils resulting in corresponding movement of the magnet 52. Sufficient movement of the compass instrument with respect to the sensitive element thereof to bring the movable plate 23 opposite either or both of the stationary plates 26 and 27 will reverse the polarity of the associated coils 50 and 51 and cause the position repeating member or magnet 52 to follow the movement of the compass throughout its complete 360° of angular travel. The movements of the oscillatory north seeking sensitive element 21 of the compass instrument are consequently repeated by the rotatably mounted magnet element 52 of the repeating means herein described.

The gyro instrument of the system is diagrammatically illustrated in Fig. 1, the same being an azimuth position direction indicating gyro whose natural rate of precession is less than the rate of oscillation of the sensitive element of the compass instrument with which it is associated. The conventional parts of the shown directional gyro include a housing 55 in which the usual vertical ring 56 is rotatably mounted. An annular compass card 57 is suitably fixed to the vertical ring 56 and when observed in connection the customary lubber line gives an azimuth indication. The normally horizontal rotor supporting gimbal ring of the gyro member is shown at 60. This ring is mounted in the usual manner on ring 56 and oscillates about a horizontally situated axis which is perpendicular to the plane of the paper in the diagrammatic showing of the same in Fig. 1 of the drawings. The gyro rotor is designated at 61, the same being shown as the air driven type and including buckets or vanes 62 against which air jets are directed to rotate the same. The jets are obtained by means of a suitable air compressor or suction device (not shown) and are directed upon the rotor through nozzle elements such as indicated at 63 and 64 which are, in this instance, respectively situated on opposite sides of the vertical axis of ring 56 in order to also control precession of the ring as will hereinafter be more particularly described. It will be understood that the herein described method of driving and precessing the gyro member is illustrative only of a desirable way in which these functions may be obtained in this type of instrument.

In the described arrangement, means are provided at the gyro member of the system for comparing the repeated directional position of the sensitive elements and the azimuth position of the gyro. This means is designated generally at 70 in Fig. 1, and is formed of the spaced plates of a condenser arrangement. As shown diagrammatically in this figure, the topmost plate 71 is arcuately shaped and is mounted on a shaft 72 rotated by the magnet element 52 of the repeating means heretofore described. Plate 71 consequently repeats the angular position of the sensitive element 21 of the system. Shaft 72 provides a positive connection between the different parts of the described device and also includes a suitable insulating material to prevent interrelation between the separate electrical portions thereof. The flat plate 71 is situated in a horizontal plane and is also constructed of a very light metal such as aluminum in order that the same may accurately repeat the angular position of the condenser plate 23.

The associated spaced part of the two-part condenser arrangement providing the comparing means comprises separate semicircular flat plates 73 and 74 mounted on a shaft 75 which extends through the upper portion of the gyro housing 55. Plates 73 and 74 are situated in a horizontal plane spaced in parallel relation with respect to plate 71. In the instant case, shaft 75 is an extension of the upper trunnion by means of which the vertical ring 56 is rotatably mounted in the housing of the gyro instrument. It will be understood that shafts 72 and 75 are situated in spaced relation for rotative movement about a common vertical axis. The condenser plates 73 and 74 of the comparing means further provide a means for repeating the azimuth position of the directional gyro.

The illustrated comparing means is operative upon displacement or disagreement in the respective compared positions from a position in angular correspondence or agreement to effect precession in azimuth of the relatively steadier gyro instrument and thereby control the gyro so the directional indication thereof closely corresponds to a given average position of the oscillatory sensitive element of the compass instrument. In the instant case, the comparing means also forms a portion of the means for effecting precession, the same not being the case, however, in the embodiment of the invention illustrated in Fig. 2. With regard to Fig. 1, the plate 71 of the condenser forms a part of a high frequency alternating current circuit which is provided with substantially constant high frequency alternating current of, for example, 1 megacycle from a suitable source such as the combined oscillator and rectifier tube 80 with its associated parts. Current of a constant high frequency is delivered to condenser plate 71 through means of a slip ring 81 and lead 82. A single bridge circuit somewhat similar to the type described in the compass repeater device is also provided, in the present instance, the same including leads 84 and 85 which are respectively connected to condenser plates 73 and 74 of the comparing means through slip rings 86 and 87. Each of the separate condenser plates 73 and 74 is connected through the respective leads 84 and 85 to the opposite terminals of a potentiometer 88 which is also provided with a grounded adjustable element 89. In the impedance capacity bridge circuit, the tube 80 is employed to rectify the alternating current and choke coils 90 are also included therein whose function is similar to that described in connection with the circuits by which the compass repeating means is controlled.

The movable coil 95 of a galvanometer relay 96 is connected across the bridge circuit formed by the leads 84 and 85 and is controlled by the condenser arrangement provided by plates 73-74 and 71. Contact arm 97 which is adapted to swing between the spaced contacts 98 and 99 is moved with coil 95 and the direction of its movement depends on the direction that the current takes in passing through the coil which is determined by the bridge circuit. When the arm 97 comes into engagement with either contact point 98 or 99 a separate independently energized circuit is closed which includes solenoid 101 and solenoid 102. In the arrangement shown the solenoid 101 is energized when arm 97 engages point 98 and solenoid 102 is likewise affected when the arm 97 comes into contact with point 99. In the instant case, the movable common core of the respective solenoids is adapted to be connected to a pivotally mounted sector plate 103 which is normally maintained in a central position with respect to the orifices, through which the air passes in entering the nozzles 63 and 64, by suitable means such as springs 104. Air passes through these orifices to annular grooves 3 and 4 with which the nozzles 63 and 64, respectively, communicate. In the diagrammatic showing in Fig. 1, plate 103 normally bisects the air entering orifices for the nozzles so that equal amounts of air pass therethrough and are directed on the buckets by the respective nozzles. In order to effect precession of the gyro in azimuth in a direction which restores agreement between the displaced parts of the comparing means and thereby control the relatively steadier gyro so the directional indication thereof closely corresponds to a given average position of the oscillatory sensitive element, the above solenoid arrangement provides a means for moving the sector plate 103 so that it closes either of the orifices and prevents air from entering either nozzle 63 or 64. As a consequence thereof, a torque is exerted about the horizontal axis of the ring 60 by means of the jets issuing from the differentially controlled nozzles which causes the vertical ring 56 to precess in azimuth in the desired direction.

In operation, it will be understood that rotatable member or condenser plate 71 of the comparing means repeats the angular position of the sensitive element 21 of the compass instrument. The directly moved condenser plates 73 and 74 operated by the directional gyro provides the other element of the comparing means and is also indicative of angular position. When there is agreement between the compared positions in the comparing means, for example, see Fig. 6, equal portions of plate 71 being disposed opposite to plates 73 and 74, the bridge circuit 84—85 controlled thereby is balanced and the system is at rest. In the event of departure from agreement of the compared positions in the comparing means, the bridge circuit 84—85 is correspondingly influenced by the condenser arrangement formed by plates 71—73 and 74 so that the current in the coil 95 of the galvanometer is caused to move in a direction that closes the required solenoid circuit through either contact point 98 or 99 and thus exerts control over the precessing instrumentalities affecting the directional gyro to effect precession thereof in azimuth and consequently move plates 73 and 74 so the same return to positional agreement with the plate 71 of the comparing means.

In the modification of the invention shown in Fig. 2, the distantly situated north seeking compass instrument with respect to the gyro has been omitted. The bridge circuit leads from the compass in this instance are designated at 44' and 40'. The repeater device including crossed coils 50' and 51' and rotatable magnetic element 52', as well as the potentiometer and choke coil units, respectively designated at 46'—42' and 45'—41' is similar to that described in connection with the form of the invention illustrated in Fig. 1. In this portion of the system, direct current is obtained by the use of rectifiers of the copper oxide type such as indicated at 106 and 107.

The major change in this form of the invention from that previously described resides in the character of the comparing means employed in the system. Instead of the capacity pick-off arrangement shown in Fig. 1, the present system employs a circuit closing device in this connection which includes a rotatable member or arm 110 which is mounted on shaft 111 and thereby adapted to assume a position corresponding to the one taken by the magnetic element 52' of the compass repeater device. Member 110 cooperates with another electrical part consisting of a bifurcated member 112 having oppositely disposed spaced arms 113 and 114 between which the arm 110 oscillates and with which it is adapted to close an electrical circuit when the parts come into actual contact. The bifurcated member 112 is mounted on shaft 75' which is shown as also extending vertically from the gyro instrument of the system, illustrated in outline in this figure, the same being of the type previously described in detail in connection with the embodied form of the invention shown in Fig. 1. Shaft 75' is controlled from the vertical ring 56' of the direction indicating gyro and movement thereof may be obtained by means of the precession causing air jet directing nozzles 63' and 64' in the manner hereinbefore described. In the present instance, operation of the separately energized circuit for effecting directed precessional movement of the vertical ring 56' of the gyro is accomplished by means of a pivoted, air cut off, sector plate 103' controlled by either solenoid 101' or 102' directly from the circuit closing device comprising the comparing means of the system. Sector plate 103' differentially controls the flow of air to the grooves 3' and 4' with which the nozzles 63' and 64', respectively, communicate. The arm on which the bifurcated member is mounted upon shaft 75' is adapted to positively assume a position in which the same repeats the azimuth position indicated on the compass card of the direction indicating gyro. The gyro precession controlling circuit is connected to the circuit closing device by means of slip ring 81' for arm 110 and slip rings 86' and 87' for the respective contacts 113 and 114 of the bifurcated member 112. This system operates similarly to the described operation of the system given in detail with regard to the form of the invention shown in Fig. 1, the present circuit closing control arrangements being the functional equivalent of both the previously described comparing means controlled impedance capacity bridge circuit and the galvanometer relay instrument operated by the same.

The system may be employed to obtain repeated directional indications of the compass controlled gyro instrument by means of a separate transmitter-receiver arrangement operated thereby as particularly disclosed in Fig. 2. These electrical devices may be of the well known position repeating type in which the stators consist of interconnected pairs of coils positioned at 90° from one another and the rotors consist of parallel alternating current excited inductor members. In the arrangement shown, the rotor of a transmitter 115 of the described type is moved by shaft 75' which is rotated by the precession effecting means for controlling the gyro. Like movement is imparted to compass cards 116 and 117 by means of the position repeating rotors of the distantly located receivers 118 and 119 respectively which are of the same electrical construction.

Figs. 3 to 5 inclusive show an improved type of air jet precession controlling means for gyros as particularly adapted for use in the disclosed gyro compass system. It will be understood, however, that the improved system is not to be considered as limited to use with any particular type of gyro precession control. The solenoid-sector plate precession controlling instrumentalities shown diagrammatically in Figs. 1 and 2 of the drawings are illustrated in more detail in Figures 3, 4 and 5, which shows the base of the gyro housing 55 as having an internally extending tubular member or boss 120. A thrust bearing is contained within the central portion of the tubular member 120, the same receiving and centralizing the end of the lower vertically disposed trunnion 121 by means of which the gimbal ring 56 is partly mounted in the gyro housing. The nozzles or jet directing elements 63 and 64 are suitably placed on the vertical ring 56 and communicate with the vertically extending passageways 122 and 123 respectively situated in the body of the trunnion forming part of the ring. Circular groove 124 is located in the trunnion 121 by way of which air enters passage 122 and nozzle 63. A similar groove 125 is provided in the trunnion body for obtaining the flow of air through passage 123 and nozzle 64. The circumferential trunnion grooves 124 and 125 cooperate with similar grooves 126 and 127, respectively, located in the boss or tubular member 120. A plurality of separate channels or passageways 130 are also situated in the tubular member 120 for leading air to the groove 126, the channel ends being open to the atmosphere through the bottom of the housing 55. A corresponding number of channels 131 are also contained in the tubular member 120 for the groove 127. Each of the separate groove channel arrangements for supplying the air to the respective nozzles 63 and 64, consequently communicates with a plurality of passageways situated in the tubular member 120 on the gyro housing 55. A casing 132 suitably secured to the housing 55 provides a containing medium in which the fixed and movable parts of the mechanism are located by which the flow of air through the passageways 130 and 131 is controlled. The bottom of casing 132 is open as designated at 133 permitting air to be drawn into the gyro instrument through nozzles 63 and 64 by means of a suitable air supplying means such as a suction pump (not shown) or other desirable instrumentality. The fixed elements contained within the circular casing 132 are preferably the solenoid coils 101 and 102 which in this instance are arcuately shaped and suitably spaced from one another. The movable element includes a rotatably mounted circular plate 134 which includes a plurality of blocking pieces 135 adapted to cover either all of passageways 130 or 131 when the same is in an operative position. A single curved core 136 is provided for the two solenoids 101 and 102, the same having an arm 137 by which it is connected to the movable plate 134. Core 136, arm 137 and plate 134 move as one piece which is normally centralized by means of a suitable centralizing device which is shown in this instance as the fixed end opposing springs 138 that engage an extension of the arm 137 for this purpose. In the normal centralized position of blocking plate 134, as shown in Fig. 4, the blocking pieces 135 are positioned between the respective grouped plural openings 130 and 131 and consequently air is permitted to be drawn through the opening 133 in casing 132, through all passageways 130 and 131 to the respective channels 126—124 and 127—125 passageways 122 and 123 and thence through nozzles or jet directing elements 63 and 64. The issuing jets drive the rotor 61 and the torques exerted by the same about the horizontal support of the gyro, in this instance, are equal and opposite in direction and consequently balance and do not effect precessional movement of the instrument. The solenoid controlling circuit provides a selective means by which the plate 134 is moved so that the blocking pieces 135 thereof either blocks all of the passageways 130 or 131 and thereby controls the flow of air to either one of the jet directing elements 63 or 64. As shown in Fig. 5, plate 134 has been moved to an operative position in which the pieces 135 cover the passageways 130. In this event, air issues from nozzle 64 only and the torque set up thereby causes precession of the vertical ring 56 in a given direction. If the selective means caused the opposite solenoid to become energized, precession of the vertical ring in the opposite direction would be effected by means of the jet issuing from nozzle 63. It is apparent that the herein disclosed air jet precession controlling means for gyros can be employed so that the torque caused by the same may be exerted about either axis of universal support of the gyro instrument.

What is claimed is:

1. In a gyro magnetic or slave gyro system, an air spun directional gyro, a pair of spaced jets for spinning the rotor of said gyro and adapted to normally exert equal and opposite torques about the axis on which the rotor is supported comprising jet directing elements, air supplying means for the directing elements, a tubular member having separate channels therein communicating with each of the directing elements and including a plurality of passageways for each of the channels, a movable plate member having a plurality of blocking pieces thereon normally situated in an ineffective position with regard to the passageways in said tubular member, and circuit controlling means including a pair of solenoids selectively energized to move said plate member to a respective position in which the blocking pieces thereof block all of the plural passageways leading to a corresponding channel and thereby control the supply of air to said jet directing elements.

2. An air spun slave directional gyro including a vertical ring rotatably mounted about a vertical axis, a pair of spaced air jets on said ring for spinning the rotor, said ring having separate passages therein for leading air to said jets, means defining a plurality of ports arranged about the vertical axis of rotation of said ring in circumferentially spaced relations, one group of alternate ports being connected with one of said passages and a second group of alternate ports being connected to the other of said passages, a rotatable member having a plurality of baffles thereon normally spaced between said ports, means for rotating said member in one direction or the other so that said baffles intercept one or the other group of ports thereby reducing the air supply to one of said jets as compared to the other a magnetic compass, and electrical means for reversibly controlling said member-rotating means, said electrical means including a pair of cooperable, relatively movable, position-comparing control elements, one thereof being positioned by said gyro and the other by said compass.

3. In an air spun slave directional gyroscope mounted for freedom about vertical and horizontal axes and including a pair of rotor spinning jets turnable with the gyroscope about said vertical axis and positioned on opposite sides of one of said horizontal axes of the gyroscope to both spin the gyro rotor and normally exert equal and opposite torques thereon about said horizontal axis, a shutter positionable for differentially varying the air flow through said jets so as to unbalance said torques about said axis and thereby cause precession in azimuth, a remote magnetic compass, means for positioning said shutter, an electrical circuit including a pair of relatively movable, cooperable electrical means for controlling said shutter-positioning means, one of said pair of means being positionable by said gyro and the other thereof by said compass.

4. A slave gyroscope as claimed in claim 3, further characterized by the fact said gyro comprises a base having separate passages therein communicating respectively with said jets, said shutter being mounted on said base in cooperative relation to said passages.

5. In a gyro-magnetic compass, a magnetic compass means, a gyroscope mounted for freedom about a vertical and a horizontal axis and for spinning about a second horizontal axis, a stationary support for said gyroscope, means forming a pair of normally balanced air jets rotatable with said gyroscope about its vertical axis and adapted when unbalanced to exert a torque about said first horizontal axis, two passages in said support for said gyroscope each continuously in communication with a respective one of said air jets regardless of the orientation of the gyroscope, shutter means in said support operable differentially to reduce the strength of one jet as compared to the other, means for operating said shutter and electrical means for controlling said shutter-operating means, said electrical means including a pair of cooperable, relatively movable electrical elements, one thereof being positioned by said gyro and the other thereof by said compass.

6. In a gyro magnetic compass combination, a direction indicating compass instrument, a directional gyro located remote from said compass instrument, air jet means for causing precession of the gyro in azimuth, a controller for varying the flow through said jet means, a repeater device at the gyro, an electrical signal receiver for controlling said device to repeat the directional indication of said compass, an electrical signal transmitter controlling said receiver and comprising a condenser having one plate movable under control of the magnetic needle and a plurality of plates fixed with respect to the craft on which said compass may be mounted, means movable in azimuth by said gyro and coacting with said device for comparing the relative directional positions of said gyro and compass, and means operable by said comparing means for operating said controller differentially to vary the flow of air through said jet means to cause said gyro to follow the average position of said compass.

7. In a gyro magnetic compass system, compass means responsive to the earth's magnetic field for providing a plurality of voltage outputs differentially varied by change in the position thereof relative to the earth's field, a directional gyro movable in azimuth and remotely positioned with respect to said compass means, means for precessing said gyro in azimuth, an electrostatic capacity-balancing circuit for controlling said precessing means including a two-part condenser, one part comprising a first plate and the other part comprising a pair of plates cooperatively disposed and relatively movable as a unit with respect to said first plate, means for effecting movement of one of said parts relatively to the other part by said gyro when azimuthal movement of said gyro occurs, and repeater means electrically connected with said compass means and controlled by the difference of said voltage outputs for maintaining the other part of said condenser in a position corresponding to the direction of the earth's field.

8. In a gyro magnetic compass system, a compass including a magnetic needle freely rotatable in the earth's field, a directional gyro movable in azimuth and remotely positioned with respect to said compass, means for precessing said gyro in azimuth, means for controlling said precessing means including two relatively movable, cooperatively disposed means for effecting an operation of said precessing means when relative movement of said two means from a predetermined relationship occurs, means for effecting movement of one of said two means relative to the other by said gyro when azimuthal movement of said gyro occurs, repeater means controlled by said compass for moving the other of said two means by and with movements of said compass needle relative to the craft on which said compass may be mounted, and a transmitter controlling said repeater, said transmitter comprising a two-part condenser, one part including a first plate and the other part including a plurality of plates cooperatively arranged and relatively movable as a unit with respect to said first plate, one of said condenser parts being connected to and movable with said needle and the other part being fixed relative to the craft on which said system may be mounted.

9. In a gyro magnetic compass system, a compass including a magnetic needle freely rotatable in the earth's field, a directional gyro movable in azimuth and remotely positioned with respect to said compass, means for precessing said gyro in azimuth, a capacity balancing circuit for controlling said precessing means including a two-part condenser, one part comprising a first plate and the other part comprising a pair of plates cooperatively disposed and relatively movable as a unit with respect to said first plate, means for effecting movement of one of said condenser parts relative to the other part by said gyro when azimuthal movement of said gyro occurs, electrical repeater means controlled by said compass for moving the other part of said condenser, transmitter means controlled by movements of said compass needle relative to the craft on which said compass may be mounted, said transmitter comprising a second two-part condenser, one part including a first plate and the other part including a plurality of plates cooperatively arranged and relatively movable as a unit with respect to said first plate, one of said second condenser parts being connected to and movable with said needle and the other part being fixed relative to the craft on which said system may be mounted, and circuit connections between said transmitter and repeater.

10. In a gyro magnetic compass, the combination with a magnetic compass having a direction indicating, rotatable sensitive element, a remote repeater, means controlled by said element for causing said repeater to reproduce the position of said sensitive element, a directional gyro adjacent said repeater, a two-part condenser, one part comprising a first plate and the other part comprising a pair of plates, one part being positioned by said repeater and the other part being positioned by said gyro, a high frequency generator for impressing a high frequency potential across the condenser parts, direct current-controlled means at the gyro for causing the same to precess in azimuth in either direction, and an electrical circuit including means responsive to an unbalanced capacitance value between the plates of one condenser part and the plate of the other for controlling said direct current-operated means whereby the gyro is caused to follow the repeater in azimuth.

11. In a gyro magnetic compass system adapted to be mounted on a navigable craft, a compass comprising a rotatably supported element sensitive to the earth's magnetic field, a directional gyro movable in azimuth and remotely positioned with respect to said compass, means for precessing said gyro in azimuth, an electrostatic capacity-balancing circuit for controlling said precessing means and including a two-part condenser, one part comprising a first plate and the other part comprising a pair of plates cooperatively disposed and movable as a unit relative to said first plate, means operated by said gyro for effecting movement of a first of said condenser parts relative to the second part when azimuthal movement of said gyro occurs, and means controlled by the sensitive element of the compass for effecting movement of the second part of said condenser to maintain said second part in a position substantially corresponding to the direction of the earth's field.

LESLIE F. CARTER.
FRANCIS WEST, Jr.

CERTIFICATE OF CORRECTION.

Patent No. 2,363,500.　　　　　　　　　　　　　　November 28, 1944.

LESLIE F. CARTER, ET AL.

It is hereby certified that error appears in the above numbered patent requiring correction as follows: In the drawings, Figure 1, for the reference numerals "63'", "64'", "55'", "56'", "3'", "4'", "101'", "102'", "103'" and "104'" both occurrences, read --63--, --64--, --55--, --56--, --3--, --4--, --101--, --102--, --103-- and --104-- respectively; page 5, first column, line 62, before "What is claimed is:" insert the following paragraph -

-- As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. --;

and that the said Letters Patent should be read with this correction therein that the same may conform to the record of the case in the Patent Office.

Signed and sealed this 10th day of April, A. D. 1945.

Leslie Frazer (Seal)　　　　　　　　　　　　　　　　Acting Commissioner of Patents.